United States Patent
Shread et al.

(10) Patent No.: US 11,791,648 B2
(45) Date of Patent: Oct. 17, 2023

(54) AUTOMATED BATTERY CHARGING

(71) Applicant: Deltran Operations USA, Inc., Deland, FL (US)

(72) Inventors: Peter Shread, Deland, FL (US); Edward Brumley, Deland, FL (US)

(73) Assignee: DELTRAN OPERATIONS USA, INC., Deland, FL (US)

( * ) Notice: Subject to any disclaimer, the term of this patent is extended or adjusted under 35 U.S.C. 154(b) by 57 days.

(21) Appl. No.: 17/334,455

(22) Filed: May 28, 2021

(65) Prior Publication Data

US 2022/0385092 A1 Dec. 1, 2022

(51) Int. Cl.
*H02J 7/00* (2006.01)

(52) U.S. Cl.
CPC ...... *H02J 7/007182* (2020.01); *H02J 7/0047* (2013.01)

(58) Field of Classification Search
CPC .................................................. H02J 7/00047
See application file for complete search history.

(56) References Cited

U.S. PATENT DOCUMENTS

| | | | |
|---|---|---|---|
| 6,417,668 B1 | 7/2002 | Howard et al. | |
| 10,553,915 B1 * | 2/2020 | Li | H02J 7/00714 |
| 2005/0088857 A1 * | 4/2005 | Yang | H02M 3/33592 363/20 |
| 2015/0130418 A1 * | 5/2015 | Kam | H02J 7/00047 320/112 |
| 2016/0181839 A1 * | 6/2016 | Racine | H02J 7/00302 320/139 |
| 2016/0380441 A1 | 12/2016 | Groat et al. | |
| 2017/0066342 A1 * | 3/2017 | Butler | B60L 53/305 |
| 2017/0331162 A1 * | 11/2017 | Clarke | G01R 31/392 |
| 2018/0026472 A1 | 1/2018 | Zhang et al. | |
| 2020/0044458 A1 * | 2/2020 | Yoon | G06F 1/263 |
| 2020/0044483 A1 * | 2/2020 | Na | H02J 50/402 |
| 2020/0185954 A1 * | 6/2020 | Song | H02J 7/345 |
| 2022/0032805 A1 * | 2/2022 | Andersson | H01M 10/44 |

FOREIGN PATENT DOCUMENTS

| | | | | |
|---|---|---|---|---|
| DE | 212021000183 U1 * | 2/2022 | | |
| EP | 3819160 A1 * | 5/2021 | | B60L 53/10 |
| GB | 2520336 A * | 5/2015 | | H01F 29/02 |

OTHER PUBLICATIONS

De-212021000183, Translation DAI, Power Supply Circuit For Use In Power Supply Device (Year: 2022).*

* cited by examiner

*Primary Examiner* — Drew A Dunn
*Assistant Examiner* — Tynese V McDaniel
(74) *Attorney, Agent, or Firm* — Fox Rothschild LLP; Carol Thorstad-Forsyth

(57) ABSTRACT

Battery charging in a battery charging system (BCS) involves measuring an output voltage of a battery connected to the BCS and determining an output voltage type of the battery. The battery is also evaluated to determine a condition of the battery for accepting a charge. Based upon the evaluation the BCS performs can automatically initiate a charge cycle for the battery in accordance with the battery output voltage type which has been determined. The BCS can also trigger an indication that the battery is not in condition for accepting a charge. A range of output charging voltages is produced using a transformer, and a switch network.

14 Claims, 12 Drawing Sheets

AUTOMATED BATTERY CHARGING

BACKGROUND

Statement of the Technical Field

The present disclosure concerns battery charging equipment. More particularly, the present disclosure concerns implementing systems and methods for battery charging equipment which automatically accommodates various types of batteries having a wide range of different nominal output voltages.

Description of the Related Art

Battery charging equipment is used to restore an electric charge to rechargeable type batteries. Basic battery chargers are often designed specifically for batteries that have a specific output voltage. For example, in the automotive field, a basic type of battery charger may be designed specifically for recharging 12 volt batteries. These types of battery charging systems have a limited range of function and their operation is relatively simple. However, there are some consumers who require a certain degree of versatility with regard to the types of batteries and systems that are being charged. Such consumers may have need of a battery charger that is capable of charging batteries of various different types and configurations. For example, motorcycles commonly use 6 volt starter batteries, automobiles commonly use 12 volt starter batteries, certain heavy duty vehicles require 24 volt batteries, and golf carts may use 48 volt batteries.

Some battery charging systems offer greater versatility with regard to charging applications. These systems can provide users with the capability of charging a variety of different battery types having different output voltages. However, some users may find configuration of such battery chargers to be excessively complex. This can lead to improper battery charging setup which results in improper charging, potential damage to equipment being charged, and risks to personal safety of users. Various attempts to find a solution to these problems have been proposed. But conventional methods and systems for implementing battery chargers capable of charging a multiplicity of different battery voltages and systems have proven to be unsatisfactory. For example, such systems may be inefficient, excessively expensive, complex and/or difficult to use.

In recent years, there has also been a growing interest in battery charging solutions which are portable in nature. These types of systems often incorporate batteries which have a very high energy density. For example, lithium-ion batteries are sometimes used for this purpose because they have a high energy density, low self-discharge rate and require very little maintenance. These types of systems have many advantages. However, one drawback is that lithium-ion batteries are relatively expensive. It is therefore desirable from the standpoint of the manufacturer to limit the number of battery cells included in each portable charger. Also, consumers want battery chargers that are lightweight and compact. Limiting the number of battery cells included in a particular portable charging unit can reduce weight and bulk associated with the system. Still, manufacturers and designers of portable battery charging solutions must ensure that a sufficient number of battery cells are included in a portable battery charging system to provide a proper charging voltage for a particular battery.

SUMMARY

This document concerns methods for automated battery charging in a battery charging system (BCS). The methods involve measuring an output voltage of a battery which has been connected to the BCS. The measuring of the output voltage of the battery is advantageously performed with an output charging circuit power switch in an open state to disconnect the output charging circuit from the battery. Based on the measuring operation, a determination is made of an output voltage type of the battery. The plurality of output voltage types correspond to output voltages values in an approximate range from V to nV, where n is an integer greater than 1. For example, the value of n in some scenarios can be selected from the group consisting of 2, 3 or 4. Thus, in a scenario where V=12 volts, and n=2, 3, 4, the range of output voltage values could include 12, 24, 36 and 48 volts. The results of the measuring operation are also evaluated for purposes of determining a condition of the battery for accepting a charge.

Based upon the forgoing evaluation steps, the BCS performs at least one automated operation. For example, the BCS can perform an automated operation which involves automatically initiating a charge cycle for the battery. This operation can involve automatically setting a BCS output charging voltage in accordance with the battery output voltage type which has been determined, and closing the power switch to connect the output charging circuit of the BCS to the battery. Alternatively, the automated operation can involve triggering an indication that the battery is not in condition for accepting a charge. Such an indication can be in the form or an error message, or other interface signal (e.g., illuminating a lamp or LED). In some scenarios, the determination of output voltage type can include performing a brief diagnostic recovery sequence as described herein.

According to one aspect, a determination of the battery output voltage type comprises a multi stage evaluation including at least a first stage and a second stage. In a first stage of the evaluation, a measured value representing the output voltage of the battery is compared to a plurality of high range threshold values for identifying an output voltage type of the battery. This set of high range threshold values is useful when the battery is in condition for accepting a charge. However, in other scenarios, the battery can be damaged or otherwise no longer functioning properly such that its output voltage will be very low. In such a scenario, application of a second stage evaluation is appropriate in which the measured value of the battery output voltage is compared to a plurality of low range threshold values.

The low range threshold values are primarily useful for identifying the output voltage type of the battery when it cannot be determined in the first stage. In general, these low range threshold values will be less than a value of V. Such condition may make it challenging to determine a battery voltage type for the battery being evaluated, particularly when the BCS is designed to accommodate automated charging of a wide range of battery voltage types. To address this problem, the second stage of the evaluation can involve a diagnostic recovery sequence. In some scenarios, the diagnostic recovery sequence comprises a first part of duration t1. This first part can include a first automated check to determine if the diagnostic recovery sequence has charged the battery to at least a first predetermined output voltage. The diagnostic recovery sequence also includes a second part of duration t2. This second part can include a second automated check to determine if the diagnostic recovery sequence has charged the battery to at least a second predetermined output voltage. This second predetermined output voltage can be advantageously selected to be greater in magnitude than the first predetermined output voltage. The diagnostic recovery sequence automatically progresses to a next higher voltage level of diagnostic charging only if the diagnostic recovery sequence has charged the battery to at least the second predetermined output voltage.

In the solution descried herein, a charge cycle for the battery can include selectively providing by the BCS an output charging voltage within a range that corresponds to values from V to nV in accordance with the output voltage type which has been determined. According to one aspect, the range of output charging voltages is made available by using a transformer, and a switch network to selectively connect two or more secondary windings of the transformer to an output charging circuit. In some scenarios, an input to the transformer primary winding can be a pulsed DC voltage. However, in other scenarios, the input to the transformer primary winding can be an AC voltage.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
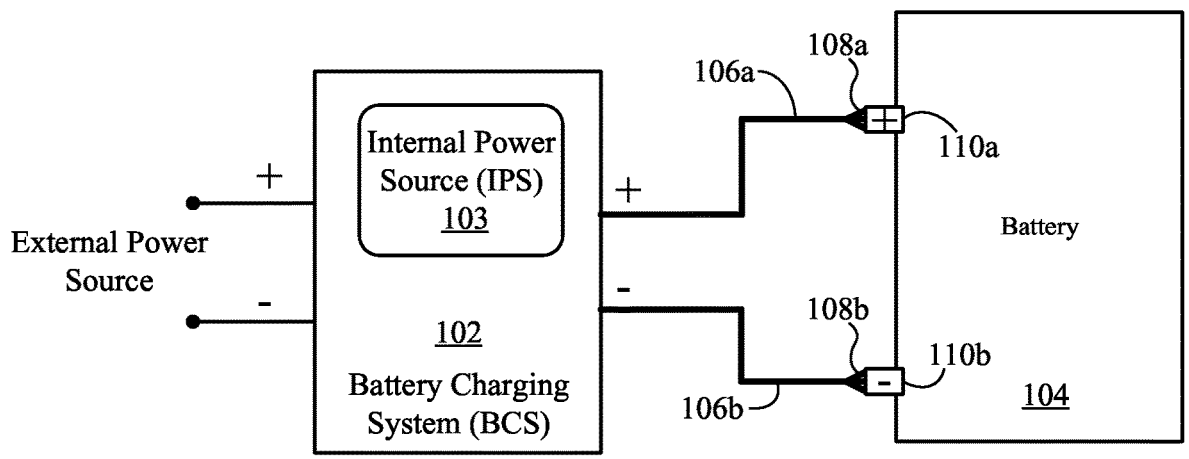
FIG. 1 is a drawing that is useful for understanding how a battery charging system (BCS) can be used to provide a charging current to a rechargeable battery.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and/or systems disclosed herein may provide certain advantages in a battery charging system. According to one aspect, the performance of a battery charging system by providing an efficient and inexpensive battery charger that is easy for consumers to use and set up for various types of batteries having different voltages. The battery charging system uses a transformer that is advantageously configured to provide a series of voltages that can be higher or lower than the input voltage. The output voltage of the battery charging system can be varied based on (1) a ratio of the primary winding to one more secondary windings, and (2) a configuration of a switching network that is connected between the secondary windings and a voltage rectifier/filter network. The plurality of transformer secondary windings are routed external to the transformer core and can be used to change the overall windings ratio to provide a different output voltage. The battery voltage of a battery which is to be charged is automatically sensed, and the system is controlled in response to such sensing so as to provide the appropriate charging voltage.

A battery charging system (BCS) 102 is shown in FIG. 1. The BCS is configured so that it is capable of providing a charging current to a battery 104. According to one aspect, the charging current is provided by the BCS through output power cables 106a, 106b which are electrically connected to positive and negative polarity terminals 110a, 110b of the battery. In some scenarios, mechanical clamps 108a, 108b can be used to facilitate the electrical connection of the output power cables to the battery terminals.

In some scenarios, power for the BCS 102 can be provided from an internal power source (IPS) 103. The internal power source 103 can be comprised of one or more battery cells which provide power for operating the BCS and for providing charging current to a battery 104. For example, in some scenarios, the internal power source may be comprised of a plurality of lithium-ion batteries. Other types of batteries can also be used for the internal power source. For example, in some scenarios, one or more lead-acid type batteries can be used for this purpose. Power for operating the BCS can also be provided from an external power source. In some scenarios, the electrical power from the external power source can be used for periodically recharging the battery cells associated with the internal power source 103. In some scenarios, the external power source can also be used to facilitate charging of battery 104.

A BCS 102 must be capable of providing a charging voltage which equals or exceeds the full charge voltage of the particular type of battery that it is intended to charge. For example, if the BCS 102 is intended to charge a battery 104 which normally provides a 12 volt output, then the BCS must be capable of supplying an output charging voltage of least 12 volts. But this requirement can present certain challenges when attempting to design a BCS which is capable of charging multiple different types of batteries having different output voltages. For example, a BCS designed for charging 12 volt will not be capable of supplying the necessary output voltage for charging a 24 volt or 36 volt battery. The BCS in such a scenario must be capable of providing a charging voltage which is greater than or at least equal to the highest voltage battery for which the BCS is designed to be capable of charging.

Still, the cost of battery cells needed for an internal battery source 103 can be substantial. Also, consumers want battery chargers that are lightweight and compact. Providing a sufficient number of battery cells in an internal battery source 103 to accommodate all potential charging scenarios can substantially increase the weight and bulk associated with the BCS. Similarly, it may not be practical or economical to ensure that a voltage of an external power source is sufficiently large in magnitude to satisfy charging needs of all types of batteries which the BCS is intended to charge.

Figure 2A:
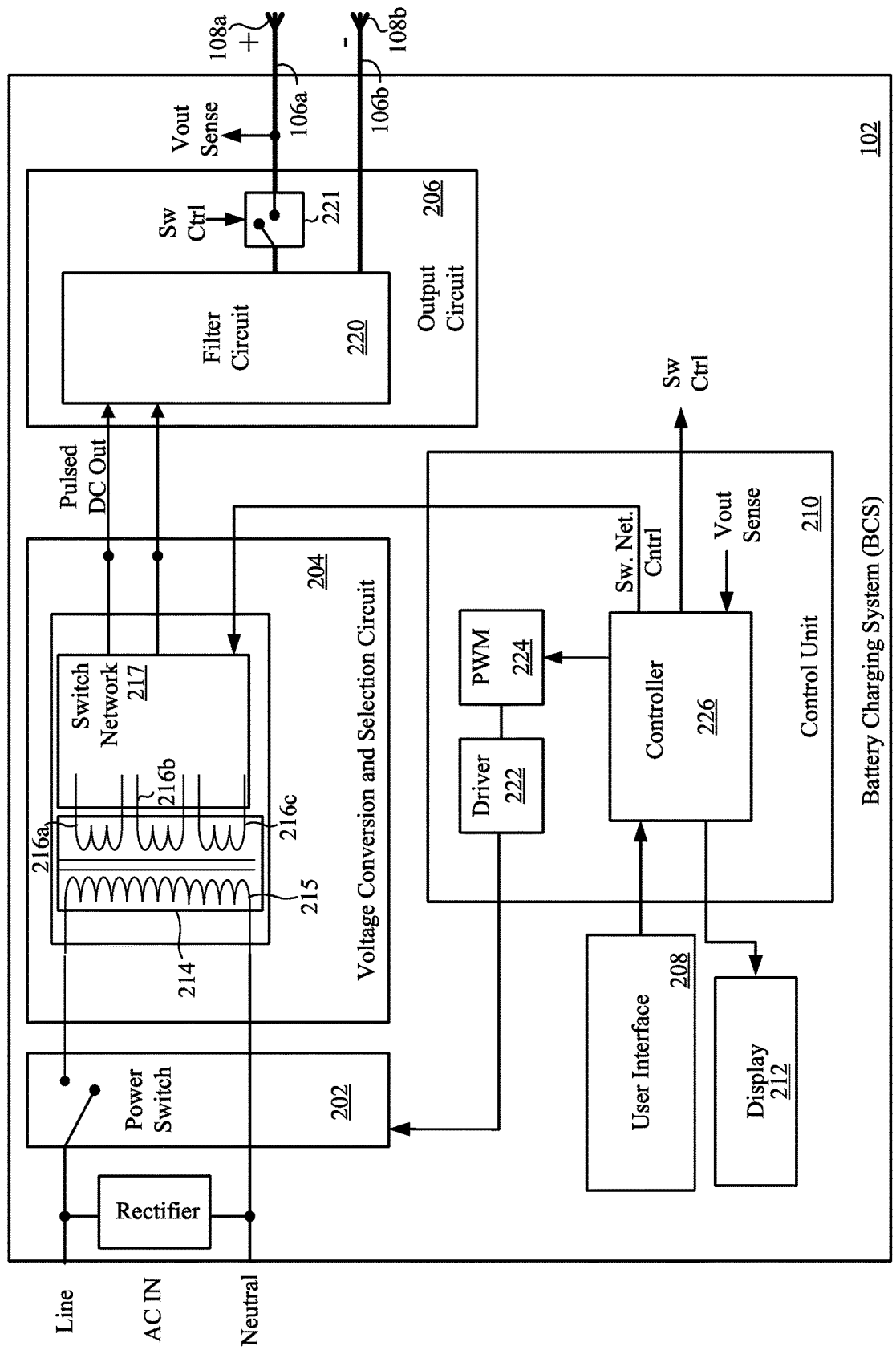
FIG. 2A is a block diagram that is useful for understanding several main functional blocks of a BCS including a transformer and a switching circuit.
Figure 2B:
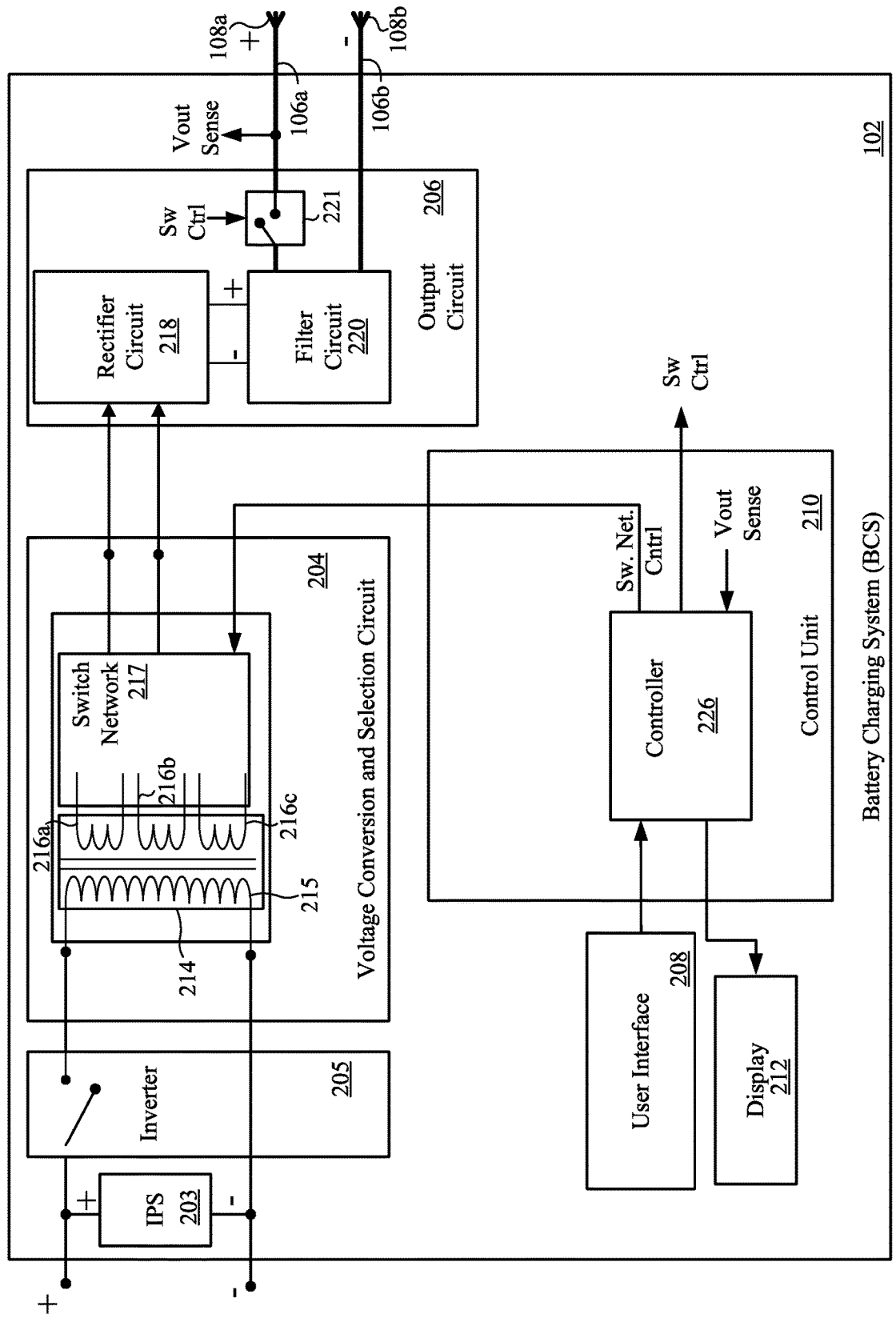
FIG. 2B is a block diagram of an alternative embodiment BCS which uses an inverter to generate an AC input to the transformer.

Referring now to FIG. 2A, there is shown a block diagram of a BCS 102 that is useful for understanding certain aspects of a BCS solution disclosed herein. The BCS 102 includes a power switch 202, a voltage conversion and selection circuit (VCSC) 204, an output circuit 206, and a control unit 210. The BCS can also include a user interface 208 to facilitate control of the BCS and a visual indicator or display 212. The VCSC 204 is comprised of a transformer 214 and a switch network 217 which are described in further detail with reference to FIGS. 3-7. The output circuit 206 can include a filter circuit 220. The control unit 210 can include a controller 226 (such as a microcontroller) and can further include additional control circuitry such as a pulse width modulator 224 and a driver circuit 222. According to one aspect, the BCS can also include an AC voltage input that can be converted to DC prior to entering power switch 202. Another aspect can include an internal power supply (IPS) 203. In some scenarios, the IPS 203 can be comprised of one or more battery cells which are capable of supplying electrical power to charge a battery (e.g., battery 104). A BCS can have more or fewer blocks compared to those shown in FIG. 2, the system shown being merely one example of a BCS which can be used in connection with the various implementations disclosed herein.

In the BCS 102, DC power provided by the IPS 203 (or an external power source) is coupled to the power switch 202. The power switch 202 converts the input DC voltage into a pulsed DC voltage using a power semiconductor switch. For example, an insulated gate field effect transistor (such as a MOSFET) can be used for this purpose. According to one aspect, the peak amplitude of the pulsed DC voltage output from power switch 202 can be substantially equal to the DC power input voltage. The resulting chopped input voltage can be raised or lowered in voltage amplitude by using a transformer 214.

Figure 3:
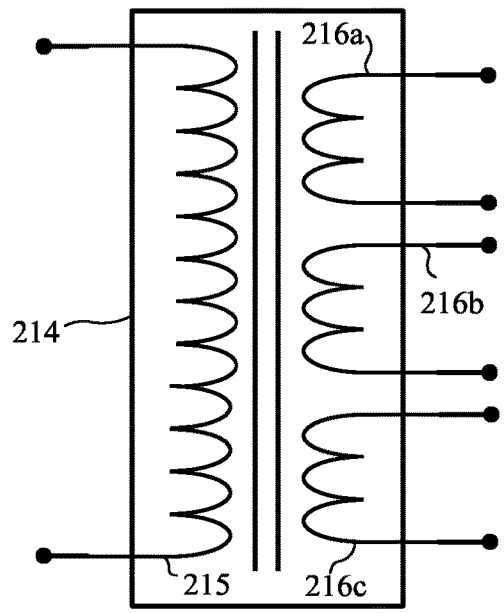
FIG. 3 is a schematic diagram showing an enlarged view of the transformer.

The pulsed DC voltage from the power switch 202 is coupled to a primary winding 215 of the transformer 214. Within the transformer the pulsed DC voltage is coupled to one or more secondary windings 216a, 216b, 216c. An enlarged view of the transformer 214 is shown in FIG. 3. In this example, the transformer is shown to have three secondary windings 216a, 216b, 216c but it should be understood that in other scenarios, the transformer could have additional secondary windings. For example, in some scenarios, a fourth secondary winding could be provided to facilitate a greater range of output charging voltages from the BCS. The pulsed DC outputs of the secondary windings 216a, 216b, 216c are coupled to a switch network 217. The switch network 217 is advantageously configured to connect one or more of the secondary windings 216a, 216b, 216c to the output circuit 206. Accordingly, pulsed DC power coupled to one or more of the secondary windings is provided through the switch network 217 to the output circuit 206. The function and various operating modes of the switch network 217 are described in greater detail in relation to FIGS. 4-7.

Pulsed DC power provided to the output circuit 206 is coupled to a filter circuit 220. The filter circuit 220 can be any suitable filter circuit that is capable of smoothing the pulsed DC output of the transformer. For example, the filter component can be a passive low pass filter that presents a high impedance to high frequency ripple which will be present in the pulsed DC provided by the output circuit. In some scenarios, the filter circuit 220 may be comprised of one or more passive elements (not shown), such as capacitors and/or inductors which are configured to reduce ripple in the DC output.

The control unit 210 can perform one or more functions relating to the operation of the BCS 102. One or more of these functions can be facilitated by a control device such as controller 226. In some scenarios, these functions can also be facilitated by an application specific circuit, a programmable logic device, a digital signal processor, and/or other circuit programmed to perform certain functions as described herein. As such, the control unit 210 can be realized in one computer system or several interconnected computer systems. Any kind of computer system or other apparatus adapted for carrying out the methods described herein is suited. A control unit 210 as described herein can receive and respond to input commands received from a user through a user interface 208. As such, the user interface can include one or more interface elements such as a keypad, switches, and/or a touch screen interface (not shown) for receiving such user inputs. The control unit 210 can also provide output signals to a display 212 to indicate a status or operating mode associated with the BCS 102. In some scenarios, the display 212 can comprise a liquid crystal display (LCD) and/or a solid state display. However, the display 212 is not limited in this regard and in other scenarios can comprise one or more optical display indicator lamps or light emitting diodes (LEDs) which indicate an operational mode or status of the BCS.

In some scenarios the output voltage of the BCS can be regulated to facilitate constant voltage output under varying load conditions. Any suitable method can be employed to facilitate such voltage regulation. According to one aspect, a pulse width modulation (PWM) technique can be employed which controls the output of power switch 202 by selectively changing the duration of time that the switch is on and off. Controlling the switch in this way provides a mechanism for varying a duty cycle of the pulsed DC voltage that is applied to the transformer. To facilitate PWM control, a feedback circuit can be utilized. The feedback circuit monitors the output voltage of the BCS and uses this information to control the duration of the on and off time.

In some scenarios the feedback circuit used for voltage regulation purposes can be implemented as part of control unit 210. For example, the controller 226 can use a $V_{out}$ Sense signal to monitor the output voltage of the BCS. In response to this output voltage the controller 226 can selectively control a PWM circuit 224. The PWM circuit generates a control signal that determines the duration of time that the power switch is conducting and the duration of time that the switch is not conducting. This control signal is communicated to a driver circuit 222 which is used to directly control the duty cycle of the power switch 202.

In some scenarios, it can be desirable for a single BCS to be capable of charging various different types of batteries that require different charging voltages. In such a scenario, the BCS must be able to output various battery charging voltages up to and exceeding the highest voltage battery that the BCS is intended to charge. But it may not be practical, efficient and/or cost effective to include with the BCS a battery power supply or IPS that is capable of providing output voltages to accommodate charging of all of such different battery types. Accordingly, the VCSC 204 can be used alone and/or in combination with the PWM circuit to efficiently provide any output voltage that is needed for a particular battery charging scenario.

More particularly, in a solution disclosed herein, the control unit 210 is advantageously configured to control the VCSC 204 to provide a suitable charging voltage for a particular battery which is being charged by the BCS. The controller 226 will use the Vout sense signal to determine a battery voltage of a battery to be charged (e.g., battery 104). Based on the measured voltage of such battery, the controller 226 will control the VCSC 204 to provide a suitable output voltage. More particularly, the processor will control the switch network 217 to select outputs of one or more secondary windings 216a, 216b, 216c to provide the proper voltage needed for each charging scenario. During periods of time when the processor is evaluating the battery voltage of a battery which is to be charged, a switch 221 can be in an open configuration so as to isolate the remainder of the charging circuitry associated with the BCS 102. This action has at least two purposes. One purpose is to protect the charging circuit from unexpected voltages which could potentially damage the BCS 102. Such unexpected voltages can include reverse polarity voltages and voltages which exceed the acceptable limits of the BCS. A further purpose of the switch 221 is to ensure that the BCS is properly configured to provide the correct output voltage before the such output is applied to the battery. Thus, the switch 221 works in conjunction with the controller 226 to protect the BCS and the battery to be charged.

Figure 4:
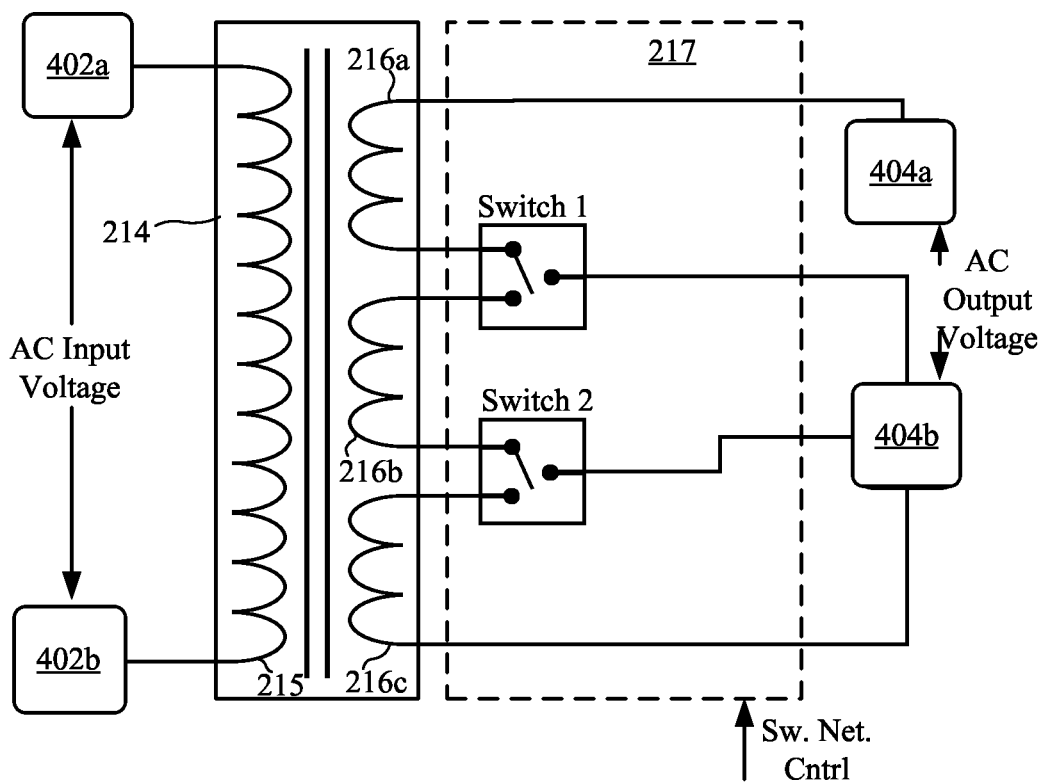
FIG. 4 is a schematic diagram that is useful for understanding the switching circuit.
Figure 5:
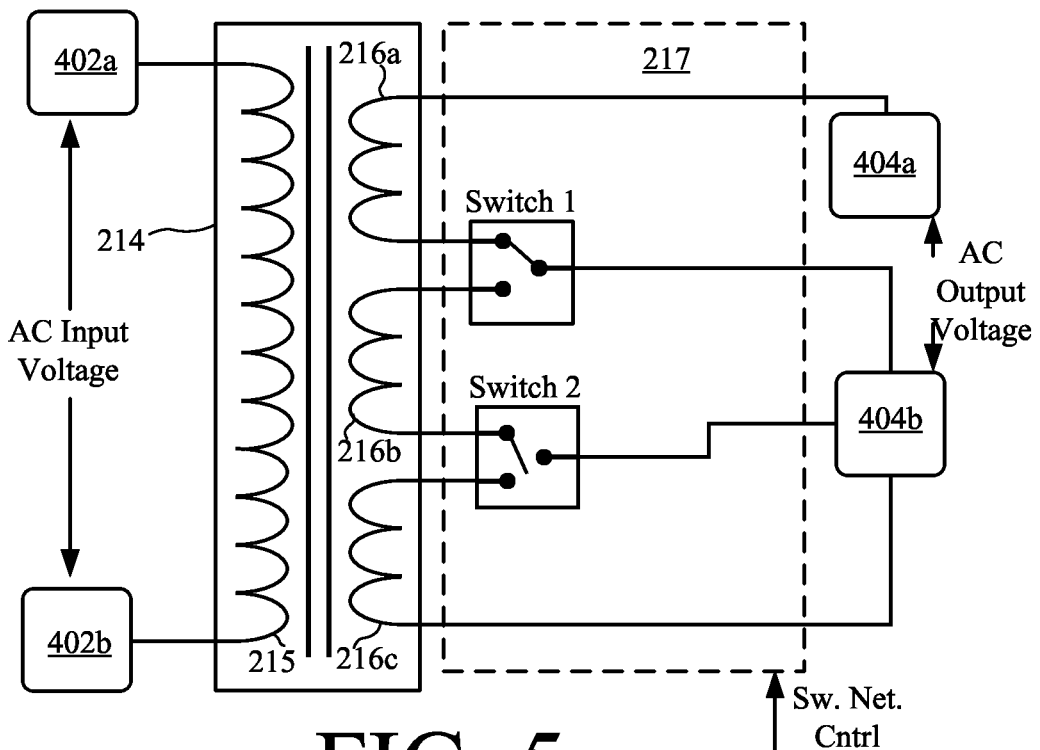
FIG. 5 is a schematic diagram showing the switching circuit in a first operating mode for producing a first output voltage from the BCS.
Figure 6:
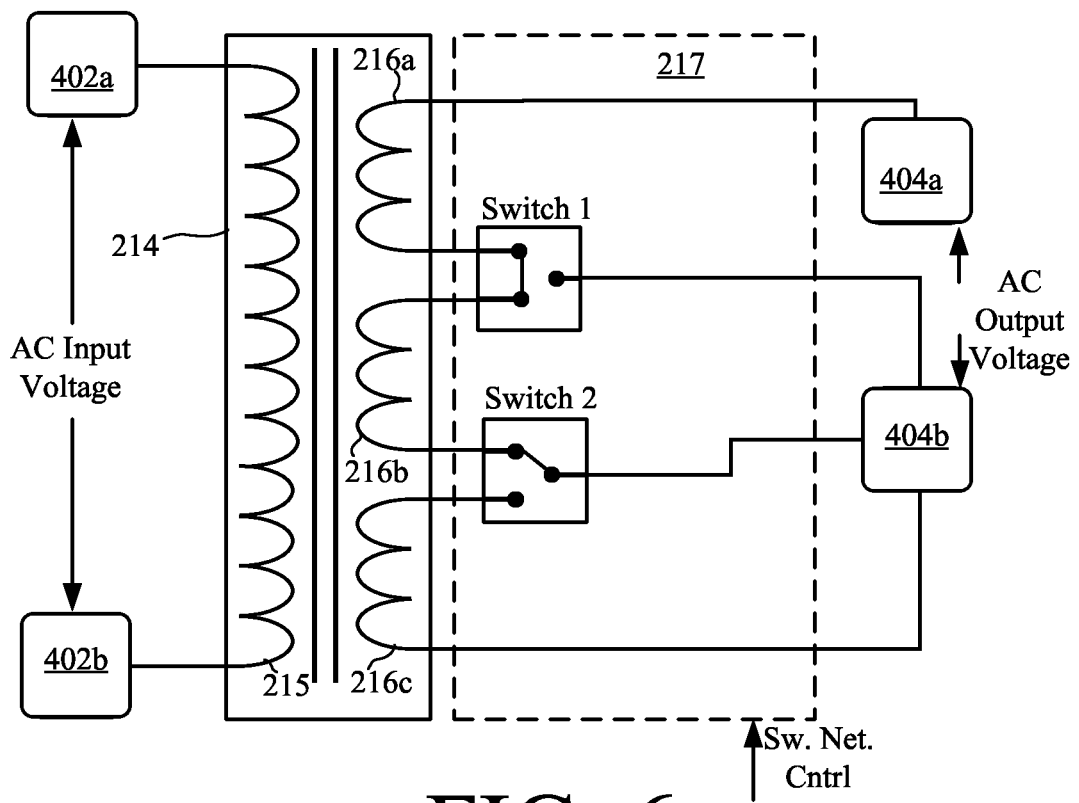
FIG. 6 is a schematic diagram showing the switching circuit in a second operating mode for producing a second output voltage from the BCS.
Figure 7:
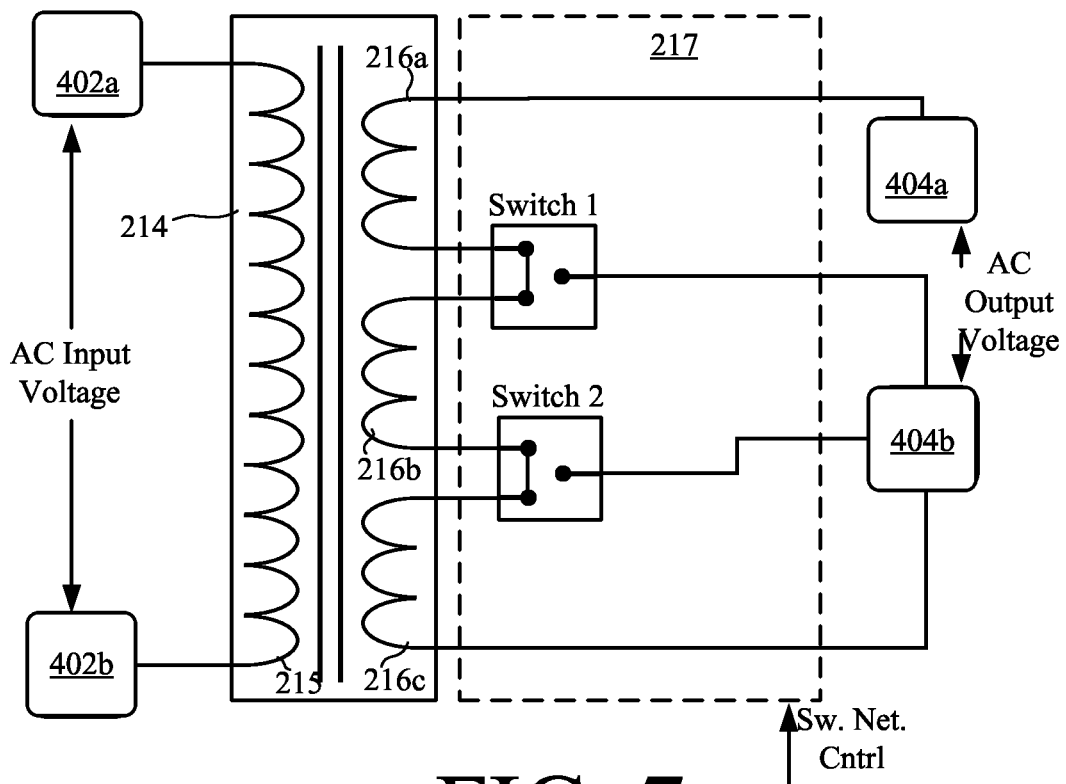
FIG. 7 is a schematic diagram showing certain the switching circuit in a third operating mode for producing a third output voltage from the BCS.

The function of the VCSC 204 will now be described in greater detail with reference to FIGS. 4-7. The transformer 214 and the switch network 217 as shown are presented as examples of one way in which the VCSC 204 can be configured to provide various different BCS output voltages. However, it should be understood that the solution disclosed herein is not limited to the particular transformer configuration and/or switch network that is shown. Referring now to FIG. 4, it can be observed that the switch network 217 can include two switches (switch 1, switch 2). Switch 1 can connect one terminal of secondary winding 216a to a first terminal of secondary winding 216b, or to output terminal 404b. Switch 2 can connect a second terminal of secondary winding 216b to one terminal of secondary winding 216c, or to output terminal 404b. The arrangement allows the outputs from one or more secondary windings to be connected to produce various different voltages at output terminals 404a, 404b. Further, for purposes of this example, the following approximate winding ratios are assumed with respect to the primary winding 215

Ratio of primary winding 215 to secondary winding 216a=1:2
Ratio of primary winding 215 to secondary winding 216b=1:1
Ratio of primary winding 215 to secondary winding 216c=1:1

The winding ratios given are approximate since the exact ratios needed will depend on the particular battery voltage types for which charging is required. Given the foregoing and an assumed 12 volt peak pulsed DC input voltage across input terminals 402a, 402b, then the peak pulsed DC output voltage across output terminals 404a, 404b will be approximately 24 volts for the switch configuration shown in FIG. 5. In this configuration, the output terminals 404, 404b are only coupled to secondary winding 216a which produces approximately a 24 volt output. With the same 12 volt peak input voltage, and the switch configuration shown in FIG. 6, the peak pulsed DC output voltage across terminals 404a, 404b will be about 36 volts. In this configuration the output terminals 404a, 404b are the sum of 24 volts produced at secondary winding 216a, and 12 volts produced at secondary winding 216b. With the same input voltage and the switch configuration shown in FIG. 7, the peak DC output voltage across terminals 404a, 404b will be about 48 volts. In this configuration the output terminals 404a, 404b are the sum of 24 volts produced at secondary winding 216a, 12 volts produced at secondary winding 216b, and 12 volts produced at secondary winding 216c. In each scenario, the resulting pulsed DC output voltage is coupled to the output circuit 206, where it is then filtered to provide a charging voltage at output cables 106a, 106b. Accordingly, with a single DC input voltage provided by IPS 203 (or an external power source) a wide variety of different output charging voltages can efficiently be made available in a portable battery charging system.

In the block diagram shown in FIG. 2A, the magnitude of the DC voltage is increased using the power switch 202 in combination with the transformer 214. In an alternative embodiment shown in FIG. 2B, the power switch can be replaced with an inverter 205 that is designed to convert the DC input into a true AC output (as opposed to a pulsed DC output). The AC output of the inverter is then used to drive the primary winding of the transformer in a manner similar to the pulsed DC voltage described above. The resulting AC output at the secondary windings 216a, 216b, 216c can then be coupled to a rectifier circuit 218. For example, the rectifier circuit 218 can comprise a full-wave rectifier circuit which converts the AC power output from the switch network to a DC voltage. In this embodiment, the filter circuit 220 can function to remove any AC ripple from the output of the full-wave rectifier circuit. Of course, other embodiments are also possible.

According to one aspect, a solution described herein further comprises a methodology which can help reduce the complexity and risks associated with battery charging where the BCS may encounter batteries designed to produce different output voltages, batteries that are partially discharged, and batteries which may be improperly connected. The method is described herein with respect to the flowchart which is shown in FIGS. 8A-8F. For purposes of this example, the BCS is assumed to be designed for charging batteries designed to output between 6 volts and 48 volts. However, it should be understood that the solution is not limited in this regard. As such, the BCS can be designed to accommodate other battery ranges using techniques similar to those described herein.

A first part of the process involves automatically determining an output voltage of the battery which is to be charged so as to identify a battery type. The battery type may correspond to a nominal output specification of the battery when it is fully charged and functioning properly. For example, the battery connected to a BCS may be designed to provide an output voltage of 12 volts, 24 volts, 36 volts or 48 volts. In order to determine an appropriate charge cycle, the BCS must first determine what type of battery the BCS is connected to. At this stage of the process, the battery is assumed to be partially discharged, but still in condition to be charged.

The process begins at 302 and continues to 304 where the BCS can sample a battery voltage (BV) of a battery which a user has connected to the BCS for charging purposes. At 306, the BCS determines if BV exceeds a first predetermined threshold voltage V1. V1 is the largest of a first series of high-range threshold values V1-V4. If BV exceeds the first predetermined high-range threshold value V1 (306: Yes), then the process continues to a schedule F recovery sequence shown in FIG. 8F (which will be described in detail below). If BV does not exceed the first predetermined high-range threshold value V1 (306: No) then the process continues in a series of steps to determine whether the voltage exceeds a series of progressively reduced high-range threshold values. For example, in the next step 312, the measured value of BV is compared to second predetermined high-range threshold value V2, which is lesser in magnitude as compared to V1.

The process at 312, 318, 324 is similar to the evaluation at 306 but in each instance the value of BV is compared to a next lower high-range threshold value V2, V3, and V4. If the conditional test in any of these evaluations is satisfied (312, 318, 324: Yes) then the process continues to a schedule C recovery sequence of FIG. 8C, a schedule D recovery sequence of FIG. 8D, or a schedule E recovery sequence of FIG. 8E. The schedule C, D and E recovery sequences will be discussed in detail below.

As one example, the foregoing the high-range threshold values V1-V4 in a scenario involving a BCS for batteries ranging from 12 volts to 48 volts can have the values set forth in Table 1. Note that in each case in Table 1, the high range threshold value is set somewhat lower than the actual expected value of the particular battery type.

TABLE 1

| High range threshold value | Inferred BCS Charging Cycle |
| --- | --- |
| V1 = 30 volts | Vo1 output voltage and current set for charging 48 volt battery |
| V2 = 20 volts | Vo2 output voltage and current set for charging 36 volt battery |
| V3 = 15 volts | Vo3 output voltage and current set for charging 24 volt battery |
| V4 = 8 volts | Vo4 output voltage and current set for charging 12 volt battery |

Of course, the solution is not limited to the exact high range threshold values set forth in Table 1. Other high-range threshold values are possible depending on the range of voltages of the different types of batteries that the BCS is intended to be capable of charging. Also, it should be understood that the high-range threshold values and BCS output voltages are approximate and different values can be selected in different scenarios without departing from the solution described herein. Further, it should be understood that each of the charging cycles referenced in Table 1 can be a conventional battery charging cycle associated with a battery of the particular output voltage that is listed. In this regard it should be understood that the BCS output charging voltage in each case will typically by somewhat greater than the nominal output voltage associated with a particular battery type. Thus, for example charging of a 12 volt battery may require a BCS output voltage of 14.6 volts. Similarly, charging a 24 volt battery may require a BCS output voltage of 29.2 volts.

If the value of BV does not exceed any of high-range threshold values V1, V2, V3, or V4 (306, 312, 318, 324: No) then the process continues to 330. At 330 a determination is made as to whether the value of BV is less than a first predetermined low-range threshold value Vmin1. Vmin1 is the lowest magnitude threshold value of a series of low-range threshold values. In some scenarios, the low-range threshold values can all be of equal or lesser magnitude as compared to the smallest value high-range threshold value (which would be V4 in Table 1). If the value of BV is less than Vmin1 (330: Yes), then a flag is set at 332 which indicates that no battery has been detected. Thereafter, the process terminates at 334. But if BV is not less than Vmin1 (330: No) then the process continues on to 336 where a determination is made as to whether BV is less than a greater magnitude low-range threshold value Vmin2. The evaluation of BV continues in this manner at 336-342 until a determination has been made that BV is less than one of the low-range threshold values Vmin1, Vmin2, Vmin3, Vmin4, Vmin5. When this condition is satisfied (e.g., 336, 338, 340, 342: Yes) the BCS will initiate a special recovery sequence as indicated in Table 2 that corresponds to the particular low-range threshold value.

TABLE 2

| Low-range Threshold Name | Inferred Recovery Sequence |
| --- | --- |
| Vmin1 | none |
| Vmin2 | Schedule B |
| Vmin3 | Schedule C |
| Vmin4 | Schedule D |
| Vmin5 | Schedule E |
| >Vmin5 | Schedule F |

So if BV is determined at 336 to be less than Vmin2 (336: Yes), then the process proceeds to 402 to initiate the Schedule B recovery sequence. If BV is determined to at 338 to be less than Vmin3 (338: Yes), then the process proceeds to 502 to initiate Schedule C charging. If BV is determined to be less than Vmin4 (340: Yes), then the process proceeds to 602 to initiate the Schedule D recovery sequence. If BV is determined to be less than Vmin5 (342: Yes), then the process proceeds to 702 to initiate the Schedule E recovery sequence. If BV is greater than Vmin5 (342: No) then the process proceeds to 802 to initiate the Schedule F recovery sequence.

As an example, in a scenario as described above involving a BCS for batteries ranging from 12 volts to 48 volts, the low-range threshold values Vmin1, Vmin2, Vmin3, Vmin4 and Vmin5 could have the values set forth in Table 3. For each low-range threshold value shown in Table 3, there is also listed an inferred recovery sequence. Of course, the solution is not limited in this regard and other threshold and/or output values are possible depending on the range of voltages of the different types of batteries that the BCS is intended to be capable of charging. Also, it should be understood that the values given can be approximate and different values can be selected in different scenarios without departing from the solution described herein.

TABLE 3

| Low-range Threshold Name | Low-range Threshold value | Inferred Recovery Sequence |
| --- | --- | --- |
| Vmin2 | 2 volts | Schedule B → 6 volt charging |
| Vmin3 | 4 volts | Schedule C → 12 volt charging |
| Vmin4 | 6 volts | Schedule D → 24 volt charging |
| Vmin5 | 8 volts | Schedule E → 36 volt charging |
| >Vmin5 | 8 volts | Schedule F → 48 volt charging |

In one example, each of the recovery sequences in Table 3 can have the attributes and/or parameters defined in Table 4.

TABLE 4

| Recovery Schedule | Inferred Recovery Sequence | BCS Output Charging Volts | BCS Output Charging Current | Check 1 | Check 2 |
|---|---|---|---|---|---|
| Schedule B | 6 volt charging | $V_{oB}$ = 7.3 V | $I_{oB}$ = 250 mA | $t1_B$ = 2 min. $VT_{B1}$ = 4 V | $t2_B$ = 7 min. $VT_{B2}$ = 5 V |
| Schedule C | 12 volt charging | $V_{oC}$ = 14.6 V | $I_{oC}$ = 250 mA | $t1_C$ = 2 min. $VT_{C1}$ = 8 V | $t2_C$ = 7 min. $VT_{C2}$ = 10 V |
| Schedule D | 24 volt charging | $V_{oD}$ = 29.2 V | $I_{oD}$ = 250 mA | $t1_D$ = 2 min. $VT_{D1}$ = 16 V | $t2_D$ = 7 min. $VT_{D2}$ = 20 V |
| Schedule E | 36 volt charging | $V_{oE}$ = 43.8 V | $I_{oE}$ = 250 mA | $t1_E$ = 2 min. $VT_{E1}$ = 24 V | $t2_E$ = 7 min. $VT_{E2}$ = 30 V |
| Schedule F | 48 volt charging | $V_{oF}$ = 58.4 V | $I_{oF}$ = 250 mA | $t1_F$ = 2 min. $VT_{E1}$ = 32 V | $t2_F$ = 7 min. $VT_{F2}$ = 40 V |

Figure 8A:
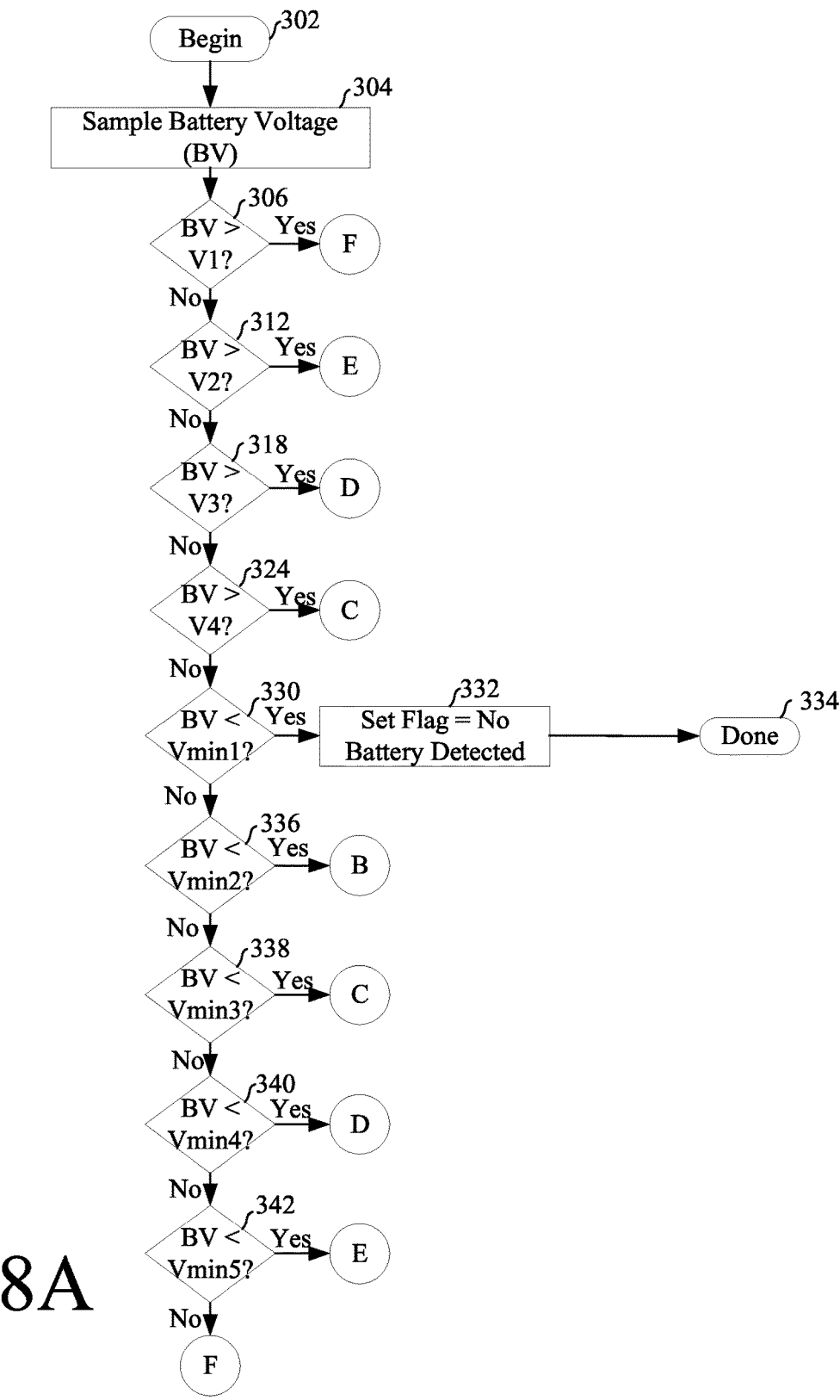
FIG. 8A-8F (collectively referred to as "FIG. 8") are a series of flowcharts that are useful for understanding the operation of the BCS.
Figure 8B:
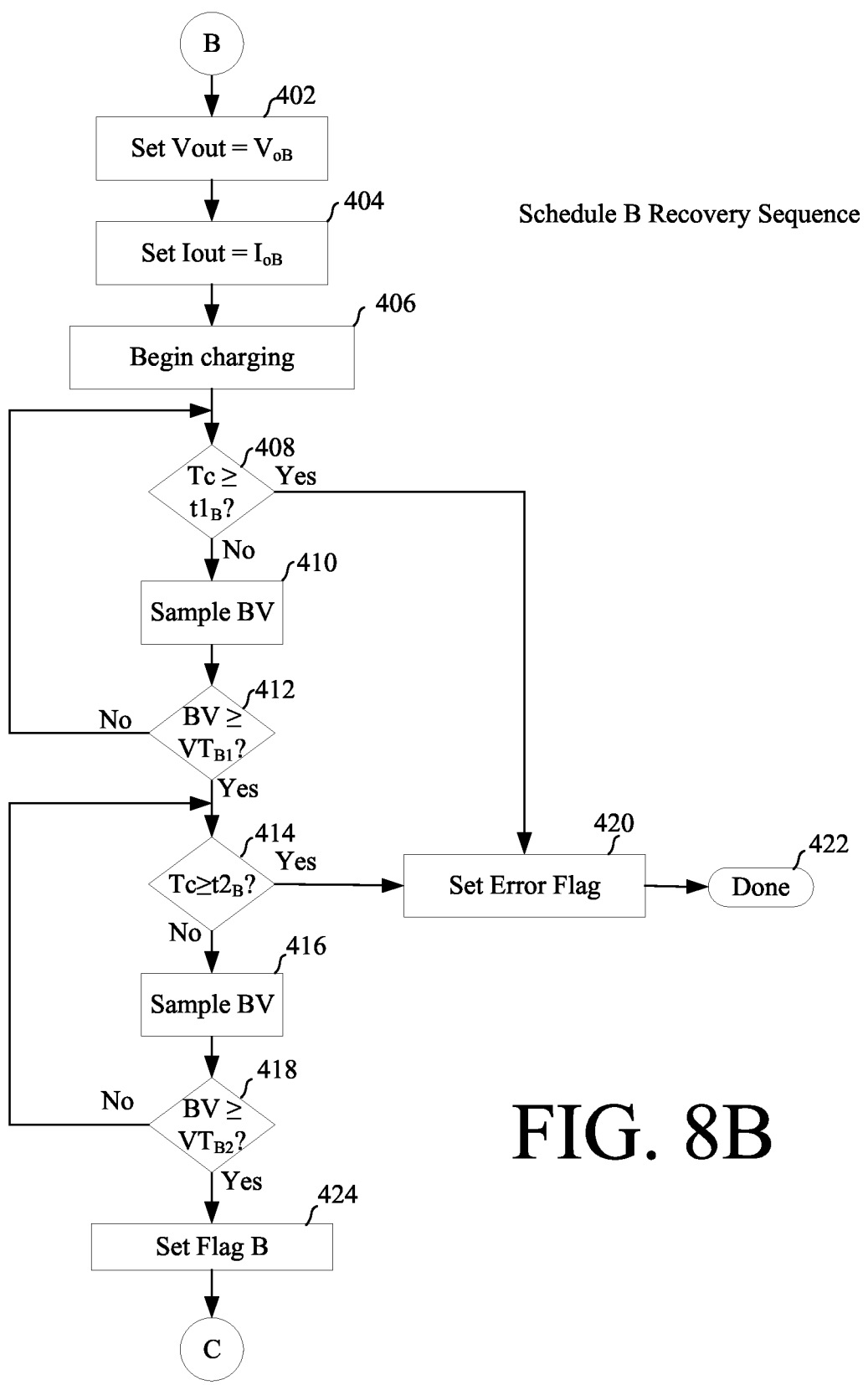
Figure 8C:
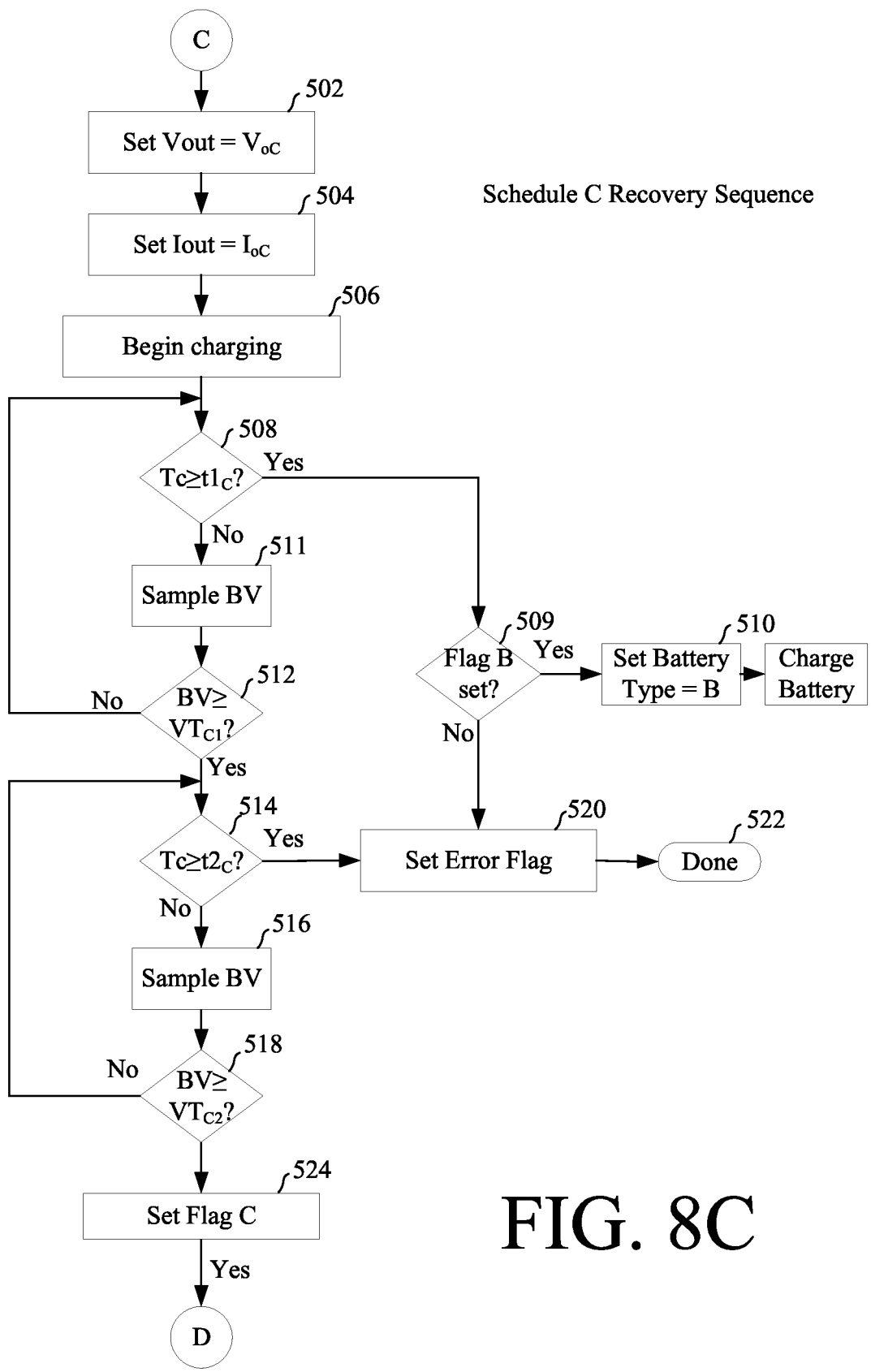
Figure 8D:
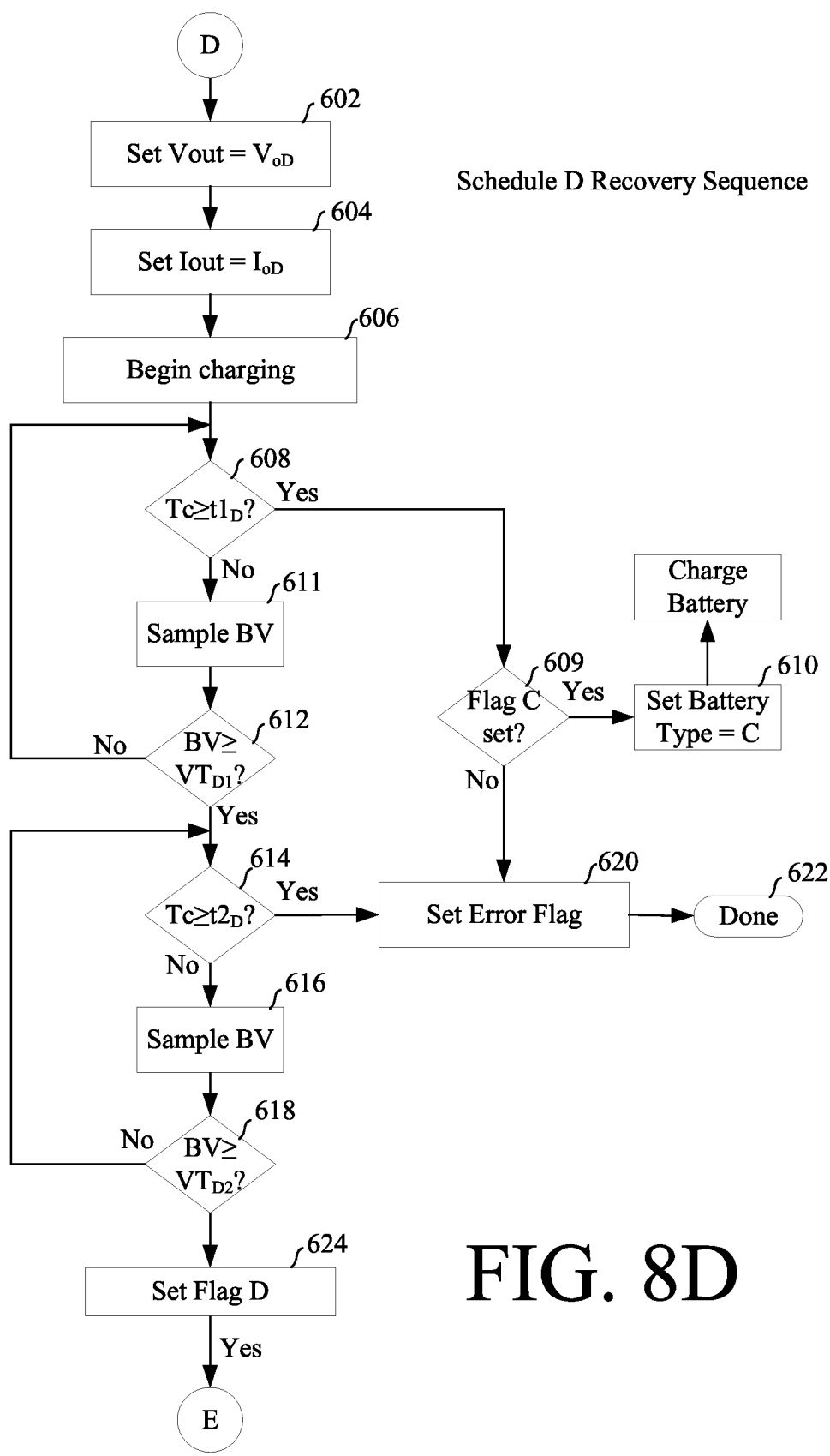
Figure 8E:
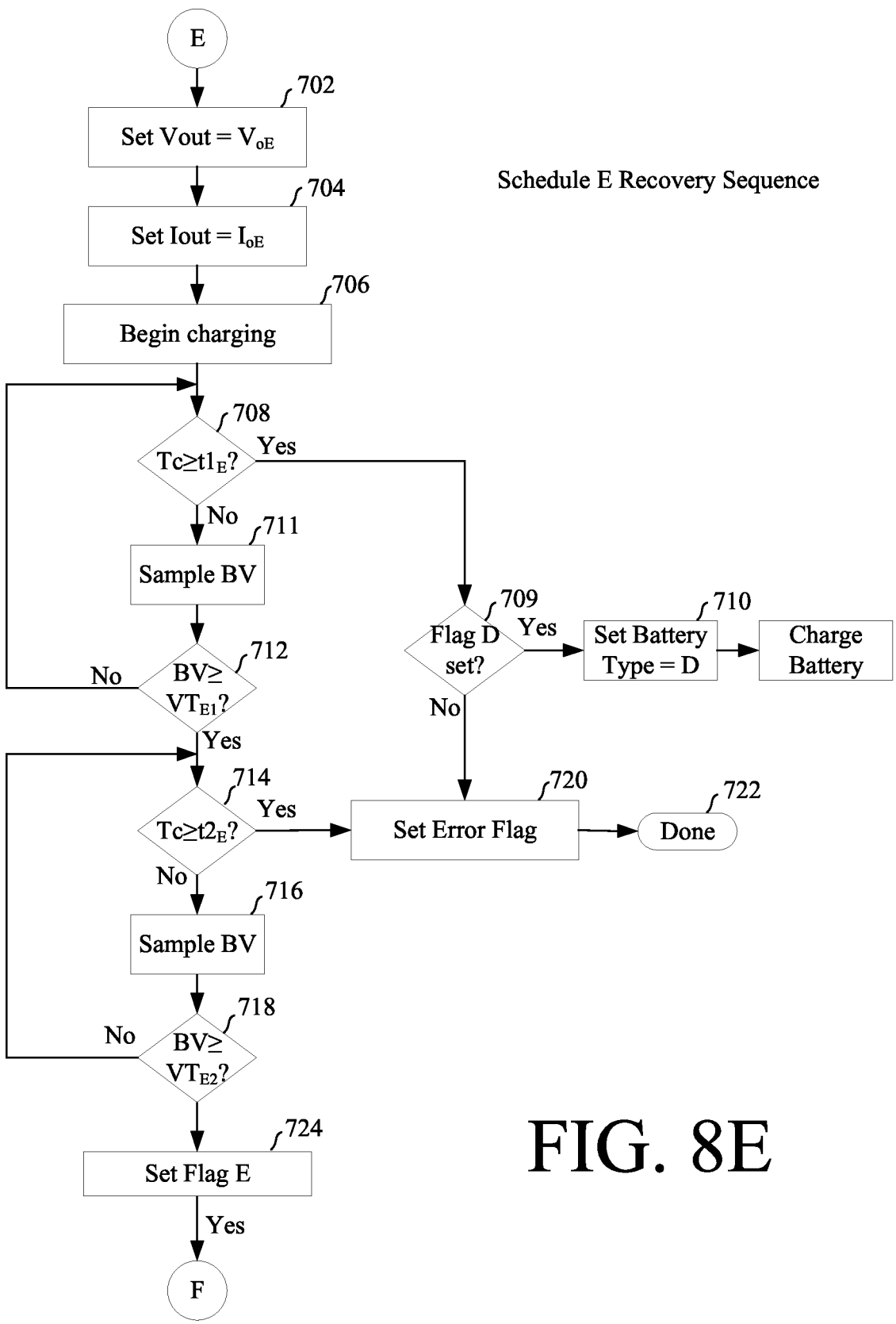
Figure 8F:
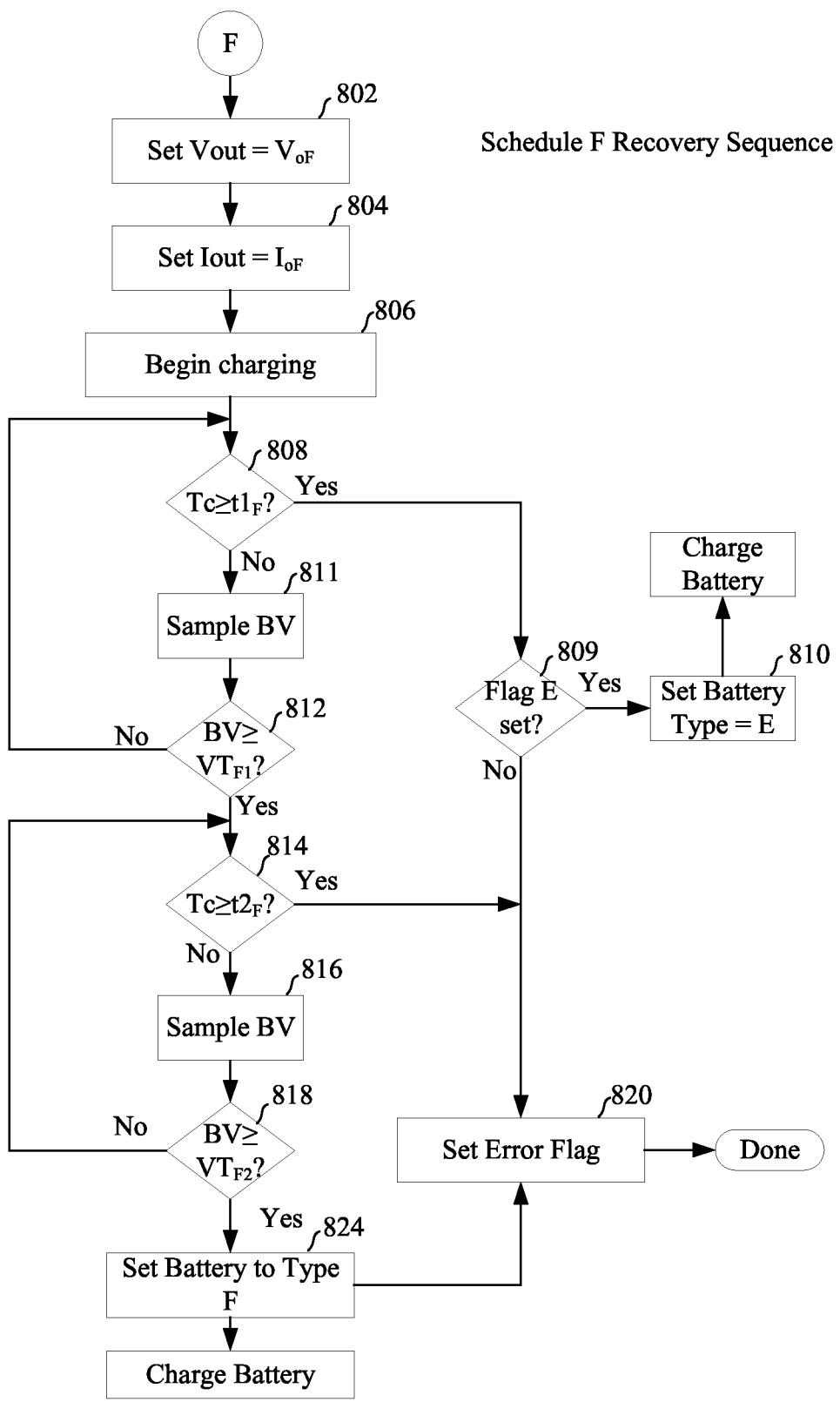

The special recovery sequences will now be described in further detail with reference to FIGS. 8B-8F. The schedule B recovery sequence is shown in FIG. 8B. The schedule C recovery sequence is shown in FIG. 8C. The schedule D recovery sequence is shown in FIG. 8D. schedule E recovery sequence is shown in FIG. 8E. The schedule F recovery sequence is shown in FIG. 8F.

Schedule B Recovery Sequence

Referring now to FIG. 8B, the BCS will initiate a Schedule B recovery sequence at 402. Charging voltage $V_{oB}$ and current $I_{oB}$ outputs are set at 402, 404 and charging begins at 406. At 408, a determination is made as to whether a time limit $t1_B$ for a first part of the recovery sequence has expired. For example, this first time limit for charging can be two minutes from when the charging cycle was first initiated. When the recovery sequence begins, 408 will produce a negative result (408: No), indicating that the time limit has not expired. Accordingly, the process will continue to 410 where the voltage BV of a battery under charge will be sampled. At 412 the first of two checks occurs to evaluate whether the recovery sequence has resulted in the value of BV equal to or exceeding a first predetermined threshold value $VT_{B1}$ for evaluating results of the first part of the recovery sequence. If not (412: No) the process will return to 408 to determine whether the first part of the recovery sequence has expired. If so (408: Yes), then an error flag is set at 420 and the process terminates at 422. Otherwise the first part of the recovery sequence continues at 410 and 412. If the first part of the recovery sequence results in the value of BV that is equal to or exceeds threshold value $VT_{B1}$, then the process continues on to 414.

At 414, a determination is made as to whether a time limit $t2_B$ has expired for a second part of the recovery sequence. For example, this second time limit for charging can be 7 minutes measured from when the charging cycle was first initiated. When the second part of the recovery sequence begins, 414 will produce a negative result (414: No), indicating that the time limit $t2_B$ has not expired. Accordingly, the process will continue to 416 where the voltage BV of a battery under charge will be sampled. At 418 the second of two checks occurs to evaluate whether the recovery sequence has resulted in the value of BV that is equal to or exceeds a second predetermined threshold value $VT_{B2}$. If not (418: No) the process will return to 414 to determine whether the second part of the recovery sequence has expired. If so (414: Yes), then an error flag is set at 420 and the process terminates at 422. Otherwise (414: No) the second part of the recovery sequence continues at 416 and 418. If the second part of the recovery sequence results in the value of BV that is equal to or exceeds threshold value $VT_{B2}$, then the process continues on to 424 at which point a Flag B is set to indicate that the Schedule B recovery sequence has been completed. Once the flag has been set, the process continues on to 502 where it proceeds with the Schedule C recovery sequence shown in FIG. 8C.

Schedule C Recovery Sequence

At 502, the BCS will initiate a Schedule C recovery sequence. Charging voltage $V_{oC}$ and current $I_{oC}$ outputs are set at 502, 504 and charging begins at 506. At 508, a determination is made as to whether a time limit $t1_C$ for a first part of the recovery sequence has expired. When the recovery sequence begins, 508 will produce a negative result (508: No), indicating that the time limit has not expired. Accordingly, the process will continue to 511 where the voltage BV of a battery under charge will be sampled. At 512 the first of two checks occurs to evaluate whether the recovery sequence has resulted in the value of BV being equal to or exceeding a first predetermined threshold value $VT_{C1}$. If not (512: No) the process will return to 508 to determine whether the first part of the recovery sequence has expired. If so (508: Yes), then a determination is made at 509 as to whether Flag B has been set (indicating that the Schedule B recovery sequence has been performed). If so, the battery is type set to Battery Type=B and the battery is charged accordingly. If not (509: No), an error flag is set at 520 and the process terminates at 522. Otherwise the first part of the recovery sequence continues at 511 and 512. If the first part of the recovery sequence results in the value of BV equaling or exceeding threshold value $VT_{C1}$, then the process continues on to 514.

At 514, a determination is made as to whether a time limit $t2_C$ has expired for a second part of the recovery sequence. When the second part of the recovery sequence begins, 514 will produce a negative result (514: No), indicating that the time limit $t2_C$ has not expired. Accordingly, the process will continue to 516 where the voltage BV of a battery under charge will be sampled. At 518 the second of two checks occurs to evaluate whether the recovery sequence has resulted in the value of BV which equals or exceeds a second predetermined threshold value $VT_{C2}$. If not (518: No) the process will return to 514 to determine whether the second part of the recovery sequence has expired. If so (514: Yes), then an error flag is set at 520 and the process terminates at 522. Otherwise (514: No) the second part of the recovery sequence continues at 516 and 518. If the second part of the recovery sequence results in the value of BV being equal to exceeding threshold value $VT_{C2}$, then the process continues on to 524 at which point a Flag C is set to indicate that the Schedule C recovery sequence has been completed. Once the flag has been set, the process continues on to 602 where it proceeds with the Schedule D recovery sequence shown in FIG. 8D. Note that the duration of the first and second part of the charging cycle defined by $t1_C$, $t2_C$ can be the same or different as the charging times applied in the charging associated with the Schedule B recovery sequence described herein.

Schedule D, E and F Recovery Sequence

Steps 602-624 in FIG. 8D concerning the Schedule D recovery sequence are similar to steps 502-524 in FIG. 8C relating to Schedule C recovery sequence. Accordingly, the Schedule D recovery sequence will not be described in detail except to note certain distinctions. For example, the Schedule D recovery sequence can involve a different charging voltage $V_{oD}$ and/or current $I_{oD}$, and different threshold values $VT_{D1}$, $VT_{D2}$. The duration of the first and second part of the charging cycle defined by $t1_D$, $t2_D$ can be the same or different as applied in the charging associated with other charging schedules described herein. Also, at 609 a determination is made as to whether Flag C has been set and if so (609: Yes) the battery type is set at 610 to Type C and the battery charged accordingly. Finally, in the Schedule D recovery sequence, Flag D is set at 624 to indicate that the Schedule D recovery sequence has been completed, after which the process continues on to the Schedule E recovery sequence at 702.

Steps 702-724 in FIG. 8E concerning the Schedule E recovery sequence are also similar to steps 502-524 in FIG. 8C relating to the Schedule C recovery sequence. Accordingly, the Schedule E recovery sequence will not be described in detail except to note certain distinctions. For example, the Schedule E recovery sequence can involve a different charging voltage $V_{oE}$ and/or current $I_{oE}$ and different threshold values $VT_{E1}$, $VT_{E2}$. The duration of the first and second part of the charging cycle defined by $t1_E$, $t2_E$ can be the same or different as applied in the charging associated with other charging schedules described herein. Also, at 709 a determination is made as to whether Flag D has been set and if so (709: Yes) the battery type is set at 710 to Type D and the battery charged accordingly. Finally, in the Schedule E recovery sequence, Flag E is set at 724 to indicate that the Schedule E recovery sequence has been completed, after which the process continues on to the Schedule F recovery sequence at 802.

Steps 802-824 in FIG. 8F concerning the Schedule F recovery sequence are also similar to steps 502-524 in FIG. 8C relating to the Schedule C recovery sequence. Accordingly, the Schedule F recovery sequence will not be described in detail except to note certain distinctions. For example, the Schedule F recovery sequence can involve a different charging voltage $V_{oF}$ and/or current $I_{oF}$ and different threshold values $VT_{F1}$, $VT_{F2}$. The duration of the first and second part of the charging cycle defined by $t1_F$, $t2_F$ can be the same or different as applied in the charging associated with other charging schedules described herein. Also, at 809 a determination is made as to whether Flag E has been set and if so (809: Yes) the battery type is set at 810 to Type E and the battery charged accordingly. Finally, in the Schedule F recovery sequence, the battery type is set at 824 to Type F and the battery charged accordingly.

In the particular example described in Tables 1-4 involving a BCS for batteries ranging from 12 volts to 48, the battery type which is set at 510, 610, 710, 810 and 824 can comprise the types presented in Table 5. It may be understood from Table 5 that a battery type as described herein can in some scenarios correspond to a category of battery having a particular intended output voltage in accordance with its design when the battery is fully charged or functioning properly.

| Battery Type | Nominal Battery Voltage |
|---|---|
| Type B | 6 volt |
| Type C | 12 volts |
| Type D | 24 volts |
| Type E | 36 volts |
| Type F | 48 volts |

The systems described herein can comprise one or more components such as a processor, an application specific circuit, a programmable logic device, a digital signal processor, or other circuit programmed to perform the functions described herein. The system can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Computer systems as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device.

Figure 9:
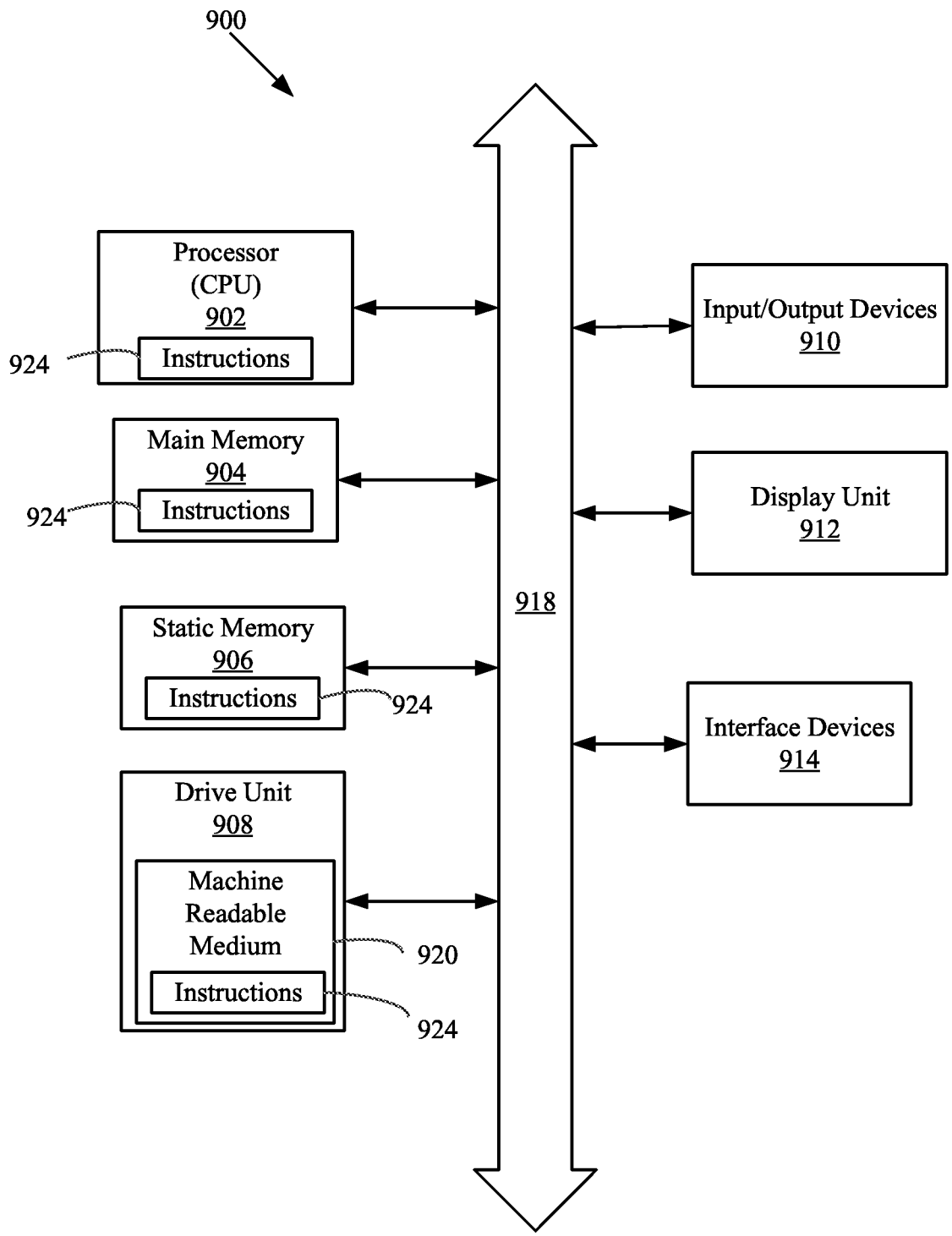
FIG. 9 a block diagram of an exemplary computer system that can perform certain processing operations as described herein for purposes of controlling the BCS.

Referring now to FIG. 9, there is shown a hardware block diagram comprising an example computer system 900 that can be used for implementing controller 226. The machine can include a set of instructions which are used to cause the computer system to perform any one or more of the methodologies discussed herein. While only a single machine is illustrated in FIG. 9 it should be understood that in other scenarios the system can be taken to involve any collection of machines that individually or jointly execute one or more sets of instructions as described herein.

The computer system 900 is comprised of a processor 902 (e.g. a central processing unit or CPU), a main memory 904, a static memory 906, a drive unit 908 for mass data storage and comprised of machine readable media 920, input/output devices 910, a display unit 912 (e.g. a liquid crystal display (LCD) or a solid state display, and one or more interface devices 914. Communications among these various components can be facilitated by means of a data bus 918. One or more sets of instructions 924 can be stored completely or partially in one or more of the main memory 904, static memory 906, and drive unit 908. The instructions can also reside within the processor 902 during execution thereof by the computer system. The input/output devices 910 can include a keyboard, a multi-touch surface (e.g. a touchscreen) and so on. The interface device(s) 914 can be comprised of hardware components and software or firmware to facilitate an interface to the analog circuitry comprising the BCS. For example, in some scenarios, the interface devices 914 can include one or more analog to digital (A/D) converters, digital to analog (D/A) converters, input voltage buffers, output voltage buffers, voltage drivers and/or comparators. These components are wired to allow the computer system to interpret signal inputs received from analog BCS circuitry, and generate the necessary control signals for certain operations described herein.

The drive unit 908 can comprise a machine readable medium 920 on which is stored one or more sets of instructions 924 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, electrically erasable programmable read-only memory (EEPROM) and flash memory devices. A tangible medium as described herein is one that is non-transitory insofar as it does not involve a propagating signal.

Computer system 900 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for automated battery charging in a battery charging system (BCS), comprising:
   providing the BCS with a plurality of output charging voltages using a voltage selection circuit comprising a transformer and a switch connected between a first secondary winding and a second secondary winding of the transformer, wherein
      a connection between a first terminal of the first secondary winding and a first output terminal of the BCS is absent of any switches,
      a connection between a first terminal of the second secondary winding and a second output terminal of the BCS is absent of any switches, and
      the switch comprising (i) a first terminal connected to a second terminal of the first secondary winding, (ii) a second terminal connection to a second terminal of the second secondary windings, (iii) a third terminal connected to the second output terminal of the BCS, (iv) configured to selectively create and break a connection between the first secondary winding and the second output terminal of the BCS, and (v) configured to selectively create and break a serial connection between the first and second secondary windings of the transformer;
   measuring an output voltage of a battery which has been connected to the BCS;
   determining based on the measuring, an output voltage type of the battery from a plurality of output voltage types, and a condition of the battery for accepting a charge;
   based on the determining, performing at least one automated operation selected from the group of
   initiating a charge cycle for the battery by automatically setting an output charging voltage of the BCS in accordance with the output voltage type which has been determined, and closing a power switch to connect an output circuit of the BCS to the battery; and
   indicating that the battery is not in condition for accepting a charge;
   wherein the plurality of output voltage types correspond to output charging voltage values in an approximate range from V to nV, where n is an integer greater than 1;
   wherein the output charging voltage is automatically set by controlling the switch of the voltage selection circuit to (1) break the serial connection between the first and second secondary windings and create the connection between the second terminal of the first secondary winding of the transformer and the second output terminal of the voltage selection circuit or (2) create the serial connection between the first and second secondary windings such that the first and second secondary windings are connected in a serial arrangement between the first and second output terminals of the voltage selection circuit and break the connection between the second terminal of the first secondary winding of the transformer and the second output terminal of the voltage selection circuit.

2. The method according to claim 1, wherein the determination of output voltage type includes performing a diagnostic recovery sequence when the battery is not in a condition for accepting a charge.

3. The method according to claim 2, wherein the value of n is selected from the group consisting of 2, 3 or 4.

4. The method of claim 2, wherein the diagnostic recovery sequence comprises a first part of duration t1 and includes a first automated check to determine if the diagnostic recovery sequence has charged the battery to at least a first predetermined output voltage.

5. The method of claim 4, wherein the diagnostic recovery sequence includes a second part of duration t2 and includes a second automated check to determine if the diagnostic recovery sequence has charged the battery to at least a second predetermined output voltage greater than the first predetermined output voltage.

6. The method of claim 5, wherein the diagnostic recovery sequence automatically progresses to a next higher level diagnostic recovery sequence exclusively upon a determination that the diagnostic recovery sequence has charged the battery to at least the second predetermined output voltage.

7. The method according to claim 1, wherein the determination of the output voltage type comprises a multi stage evaluation including
a first stage in which a measured value representing the output voltage of the battery is compared to a plurality of high range threshold values for identifying an output voltage type of the battery when in condition for accepting a charge, and
second stage in which the measured value is compared to a plurality of low range threshold values for identifying the output voltage type of the battery when not in condition for accepting a charge.

8. The method according to claim 7, wherein the second stage of the evaluation is performed if the output voltage of the battery cannot be determined in the first stage.

9. The method of claim 7, wherein the low range threshold values are all less than a value of V.

10. The method of claim 1, wherein the output voltage types are 12 volts, 24 volts, 36 volts and 48 volts.

11. The method of claim 1, wherein the measuring of the output voltage of the battery is performed with the power switch in an open state to disconnect the output circuit from the battery.

12. The method of claim 1, wherein the charge cycle for the battery includes selectively providing by the BCS an output charging voltage within a range that corresponds to values from V to nV in accordance with the output voltage type which has been determined.

13. The method of claim 12, wherein a ratio of the primary winding of the transformer to the first secondary winding is different than a ratio of the primary winding to the second secondary winding of the transformer.

14. The method of claim 13, further comprising supplying an input to the transformer primary winding selected from the group consisting of a pulsed DC voltage and an AC voltage.

* * * * *